L. BISSELL.
Carriage-Spring.
No. 2,307.
Patented Oct. 11, 1841.
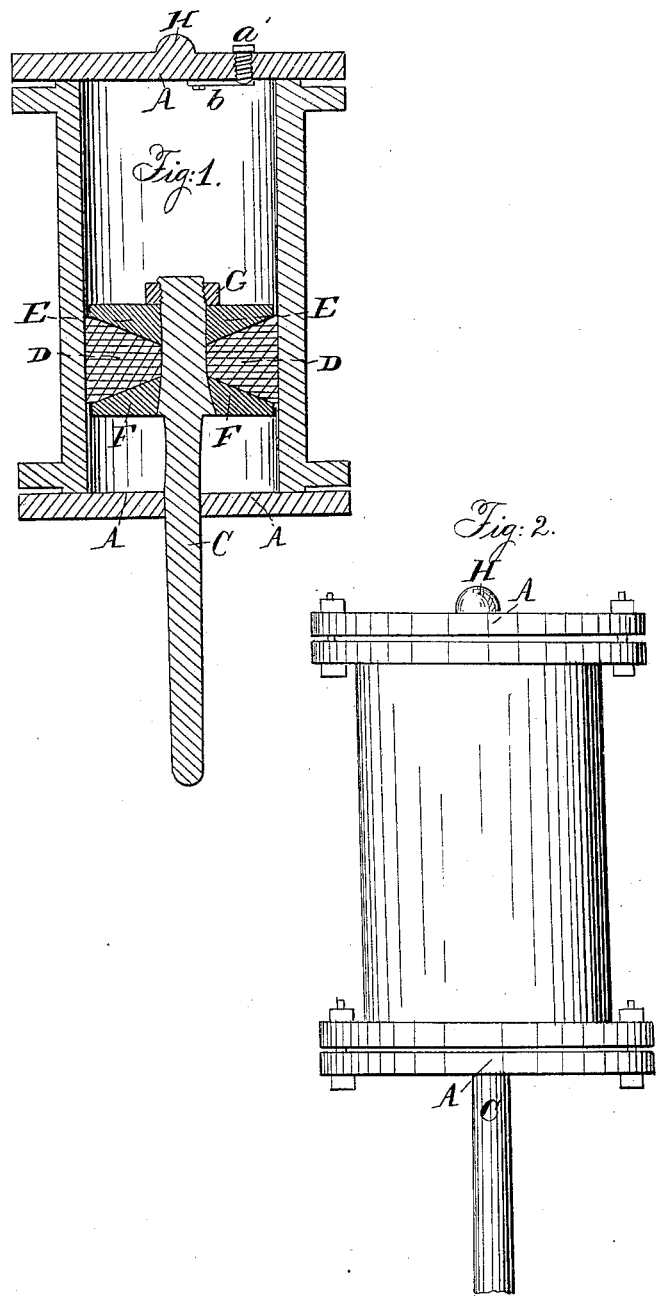

UNITED STATES PATENT OFFICE.

LEVI BISSELL, OF NEWARK, NEW JERSEY.

SPRING FOR RAILROAD-CAR OR OTHER CARRIAGES IN WHICH COMPRESSED ATMOSPHERIC AIR OR OTHER PERMANENTLY-ELASTIC FLUID IS EMPLOYED.

Specification of Letters Patent No. 2,307, dated October 11, 1841.

*To all whom it may concern:*

Be it known that I, LEVI BISSELL, of the city of Newark, in the county of Essex and State of New Jersey, have invented a new and improved mode of applying atmospheric air or any other permanently-elastic fluid for springs to railroad-cars and carriages of every kind requiring springs, of which the following is a full and exact description.

I suspend the body of the car, or carriage on cylinders of cast iron or other metal or materials in which the air is compressed, and confined by movable pistons working air tight; the cylinders and pistons being very similar to those of a common steam engine. For a common railroad car of sufficient size to carry sixty persons, I make use of cylinders twelve inches and a half in length, and six inches in diameter, which are very accurately and smoothly bored; a longitudinal section of which is represented in Figure 1, in the annexed drawings; Fig. 2 being a representation of the cylinder entire. The same letters representing the corresponding parts in both figures.

The ends of the cylinder are closed by metallic heads A, A, which are fastened on with screw bolts, and made air tight. One of the heads has a stuffing box B, through which the piston rod C works. The piston is made to work air tight in the cylinder by means of the packing D, D, made of good firm tanned leather, placed between the plates E and F; and by turning up the nut G, on the piston rod, the packing is tightened, when necessary. The top of the piston is kept covered with oil, which keeps it properly lubricated, and also tends to prevent the escape of air around the edge of the piston. Four of these cylinders are placed under the body of the car, and support its whole weight; the lower ends of the piston rods resting in proper steps placed on the frame work of the car, and the body resting on the projection H, on the center of the upper head.

The air is condensed in the cylinders by means of a small forcing pump, which is screwed into the upper head of the cylinder as at $a'$, under which a valve $b$ is placed, on the under side of the cylinder head, by which the air is retained until the pump is removed, and a plug screwed in. Thus the whole weight of the car body, with the entire contents, is supported by the four columns of air confined in the four cylinders, which being perfectly elastic, makes the most effective and pleasant spring that can be made.

What I claim as my invention, and desire to secure by Letters Patent, is—

The application of compressed air or other permanently elastic fluid, in a cylindrical, or other shaped vessel, made of metal or other hard substance, and acting against a piston working therein, for the purpose of springs for railroad cars, or other carriages.

LEVI BISSELL.

Witnesses:
PETER JACKSON,
STEPHEN DOD.